(12) United States Patent
Mulgaonkar et al.

(10) Patent No.: US 12,556,350 B2
(45) Date of Patent: Feb. 17, 2026

(54) METHOD AND SYSTEM FOR ENABLING RECEPTION OF PLURALITY OF PDCCH FROM PLURALITY OF TRPs

(71) Applicant: Samsung Electronics Co., Ltd., Suwon-si (KR)

(72) Inventors: Dattaraj Dileep Raut Mulgaonkar, Bangalore (IN); Diwakar Sharma, Bangalore (IN); Kyoungmin Park, Suwon-si (KR); Karthik Muralidhar, Bangalore (IN); Santanu Mondal, Bangalore (IN); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 18/326,444

(22) Filed: May 31, 2023

(65) Prior Publication Data

US 2023/0396404 A1    Dec. 7, 2023

(30) Foreign Application Priority Data

Jun. 2, 2022   (IN) .............................. 202241031666
May 16, 2023  (IN) .............................. 2022 41031666

(51) Int. Cl.
*H04L 5/00*      (2006.01)
*H04W 72/231*   (2023.01)

(52) U.S. Cl.
CPC .......... *H04L 5/0098* (2013.01); *H04L 5/0053* (2013.01); *H04W 72/231* (2023.01)

(58) Field of Classification Search
CPC ... H04L 5/0098; H04L 5/0053; H04L 5/0094; H04L 5/0091; H04W 72/231; H04B 7/0413
See application file for complete search history.

(56) References Cited

U.S. PATENT DOCUMENTS

2021/0314953 A1    10/2021  Park et al.
2022/0030620 A1 *   1/2022  Cirik ..................... H04W 16/28
(Continued)

FOREIGN PATENT DOCUMENTS

WO    2021/006715 A1    1/2021
WO    2021/224283 A1   11/2021

OTHER PUBLICATIONS

Samsung, 'Maintenance on Rel-17 multi-TRP and HST-SFN', R1-2203856, 3GPP TSG RAN WG1 #109-e, e-Meeting, Apr. 25, 2022.

(Continued)

*Primary Examiner* — Christine Ng
(74) *Attorney, Agent, or Firm* — Jefferson IP Law, LLP

(57) ABSTRACT

The disclosure relates to a 5G or 6G communication system for supporting a higher data transmission rate. According to the disclosure, a method and a User Equipment (UE) for enabling reception of plurality of Physical Downlink Control Channel (PDCCH) from plurality of Transmission Reception Points (TRPs) are provided. The method includes receiving, by the UE, at least one Radio Resource Control (RRC) configuration message in relation to at least one TRP of a plurality of TRPs within a cell in a wireless communication system, wherein the at least one RRC configuration message comprises one or more CORESETpoolindex for one or more corresponding CORESETs associated with the at least one TRP, and wherein the at least one RRC configuration message is used to configure the one or more CORESETs and a plurality of search spaces associated with each CORESET, and enabling reception of each PDCCH of a plurality of PDCCH from each TRP of the plurality of TRPs based on the at least one RRC configuration message.

20 Claims, 10 Drawing Sheets

(56) References Cited

U.S. PATENT DOCUMENTS

| | | | | |
|---|---|---|---|---|
| 2022/0070899 | A1* | 3/2022 | Huang | H04W 72/23 |
| 2022/0116859 | A1* | 4/2022 | Park | H04W 72/02 |
| 2022/0210818 | A1* | 6/2022 | Cirik | H04W 72/232 |
| 2022/0225286 | A1* | 7/2022 | Cirik | H04W 72/23 |
| 2022/0225291 | A1* | 7/2022 | Khoshnevisan | H04W 72/23 |
| 2022/0240224 | A1* | 7/2022 | Xu | H04W 72/046 |
| 2023/0247707 | A1* | 8/2023 | Chen | H04W 76/19 |
| 2023/0254716 | A1* | 8/2023 | Khoshnevisan | H04W 16/28 370/329 |
| 2024/0098531 | A1* | 3/2024 | Gao | H04B 7/06956 |
| 2025/0175952 | A1* | 5/2025 | Yuan | H04L 5/0094 |
| 2025/0184096 | A1* | 6/2025 | Yuan | H04L 5/0091 |

OTHER PUBLICATIONS

VIVO, 'Maintenance on enhancements for multi-TRP deployment', R1-2203506, 3GPP TSG RAN WG1 #109-e, e- Meeting, Apr. 25, 2022.

International Search Report dated Aug. 31, 2023, issued in International Application No. PCT/KR2023/007403.

Indian Office Action dated Dec. 11, 2025, issued in an Indian Patent Application No. 202241031666.

\* cited by examiner

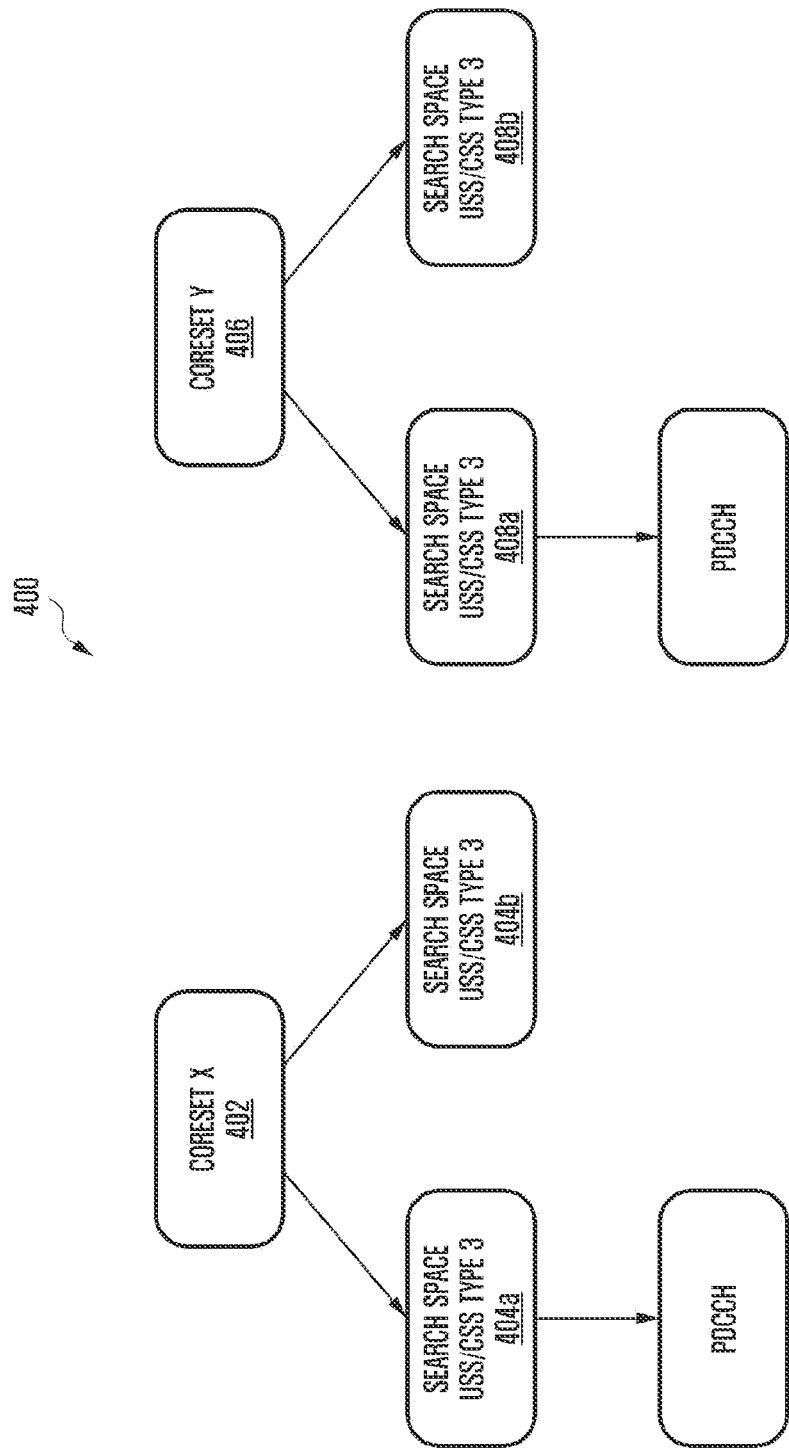

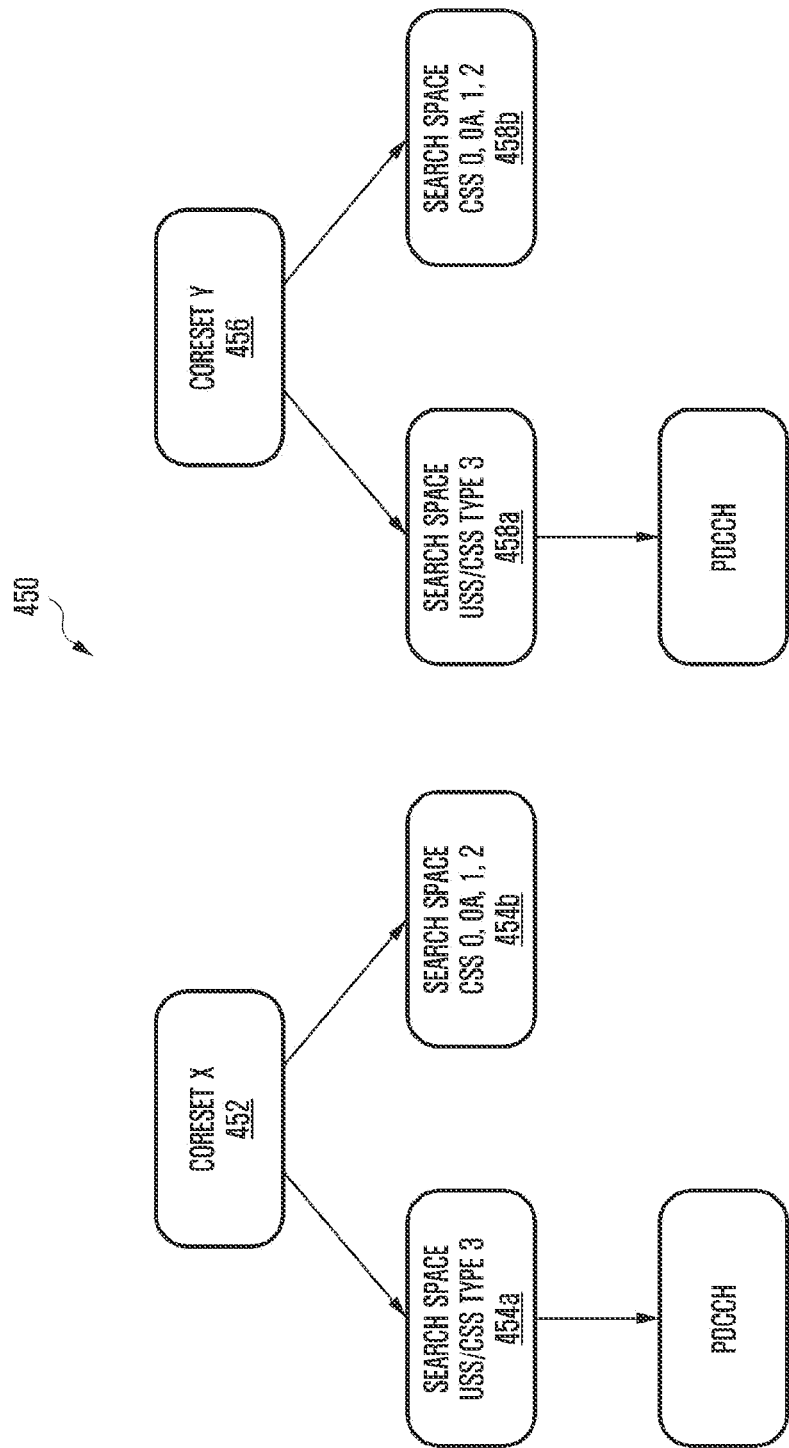

METHOD AND SYSTEM FOR ENABLING RECEPTION OF PLURALITY OF PDCCH FROM PLURALITY OF TRPs

CROSS-REFERENCE TO RELATED APPLICATION(S)

This application is based on and claims priority under 35 U.S.C. § 119(a) of an Indian Provisional patent application number 202241031666, filed on Jun. 2, 2022, in the Indian Patent Office and of an Indian Non-Provisional patent application number 202241031666, filed on May 16, 2023, in the Indian Patent Office, the disclosure of each of which is incorporated by reference herein in its entirety.

BACKGROUND

1. Field

The disclosure relates to a wireless communication standard to be used in a User Equipment (UE). More particularly, the disclosure relates to a method and system for enabling reception of a plurality of Physical Downlink Control Channel (PDCCH) from a plurality of Transmission Reception Points (TRPs) using a Unified Transmission Configuration Indicator (TCI) framework.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The term 'Transmission Configuration Indicator' (TCI) was introduced in release 15 of 3rd Generation Partnership Project (3GPP) for beam management signaling framework, where target signals (PDCCH, physical downlink shared channel (PDSCH), channel state information reference signal (CSI-RS)) to be received by User Equipment (UE) are Quasi Co Location (QCL) with source signals. Accordingly, QCL can be of different types depending on channel parameters to follow for receiving the target signals. Further, TCI framework of release 15/16 of the 3GPP was based on TCI indication for individual downlink (DL) channels and reference signals (RS). Although this was very flexible and independent, for many scenarios, base station (BS) may need only few beams to communicate with UE, also for practical operation, BS use same TCI state for multiple channels and RS. However, this resulted in redundant signaling for each channel/RS.

As such, to remove this redundant signaling, Release 17 of 3GPP introduced common TCI states for receiving data and control information in DL and uplink (UL). Accordingly, common TCI state is applied to multiple channels/RS for receiving the data and control information in DL and UL i.e., receiving the target signals PDCCH, PDSCH, CSI-RS. More specifically, a TCI state are configured for Component Carrier (CC)/Bandwidth Part (BWP) or set of CCs/BWPs for carrier aggregation (CA). As such, current Release 17 supports only one common TCI state for all the CORESETS defined in one BWP. The source reference signal in common TCI state provides the QCL information for at least UE-dedicated PDCCH/PDSCH and/or common UL TX spatial filter(s) at least for UE-dedicated physical uplink shared channel (PUSCH)/physical uplink control channel (PUCCH) across a set of configured CCs/BWPs.

Release 17 (referred to herein as Rel-17) introduced a unified TCI framework, for any DL RS that does not share the same indicated Rel-17 TCI state(s) as UE-dedicated reception of PDSCH and for UE-dedicated reception on all or subset of CORESETs in a CC, but can be configured as a target DL RS of a Rel-17 DL TCI state pool Rel-17 mechanisms which reuse the Rel-15/16 TCI state update signaling/configuration design(s) are used to update/configure such DL RS(s) with Rel-17 TCI state(s) for single TRP scenarios. However, with m-TRP scenarios, Unified TCI framework is being extended to more than one TCI state in uplink (UL) and downlink (DL) for supporting mTRPs in Release 18 of the 3GPP enhancements. As such, there exists no signaling to indicate which TCI state is to be applied to the UE for receiving the target signals from the multiple TCI states of the Unified TCI framework.

In view of the above discussion, there exists a need for an efficient method and system for enabling reception of a plurality of PDCCH from a plurality of Transmission Reception Points (TRPs) using a Unified TCI framework.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for enabling reception of a plurality of Physical Downlink Control Channel (PDCCH) from a plurality of Transmission Reception Points (TRPs) using a Unified Transmission Configuration Indicator (TCI) framework.

Additional aspects will be set forth in part in the description which follows and, in part, will be apparent from the description, or may be learned by practice of the presented embodiments.

In accordance with an aspect of the disclosure, a method for enabling reception of a plurality of PDCCH from a plurality of Transmission Reception Points (TRPs) is provided. The method includes receiving, by a User Equipment (UE) in a wireless communication system, at least one Radio Resource Control (RRC) configuration message in relation to at least one TRP of a plurality of TRPs within a cell in the wireless communication system. The at least one RRC configuration message comprises one or more CORESET-poolindex for one or more corresponding CORESETs associated with the at least one TRP. The at least one RRC configuration message is used to configure the one or more CORESETs and a plurality of search spaces associated with each CORESET of the one or more CORESETs. The method includes enabling, by the UE, reception of each PDCCH of a plurality of PDCCH from each TRP of the plurality of TRPs based on the at least one RRC configuration message.

In accordance with another aspect of the disclosure, a User Equipment (UE) in a wireless communication system for enabling reception of a plurality of PDCCH from a plurality of Transmission Reception Points (TRPs) is provided. The UE includes a memory configured to store instructions and a processor configured to execute the instructions stored in the memory and thereby cause the UE to receive at least one Radio Resource Control (RRC) configuration message in relation to at least one TRP of a plurality of TRPs within a cell in the wireless communication system. The at least one RRC configuration message comprises one or more CORESETpoolindex for one or more corresponding CORESETs associated with the at least one TRP. The at least one RRC configuration message is used to configure the one or more CORESETs and a plurality of search spaces associated with each CORESET of the one or more CORESETs. The UE is configured to enable reception of each PDCCH of a plurality of PDCCH from each TRP of the plurality of TRPs based on the at least one RRC configuration message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4A illustrates an example scenario of enabling reception of a plurality of PDCCH from a corresponding plurality of TRPs, according to an embodiment of the disclosure;

FIG. 4B illustrates an example scenario of enabling reception of a plurality of PDCCH from a corresponding plurality of TRPs, according to an embodiment of the disclosure;

Throughout the drawings, it should be noted that like reference numbers are used to depict the same or similar elements, features, and structures.

DETAILED DESCRIPTION

Figure 1:
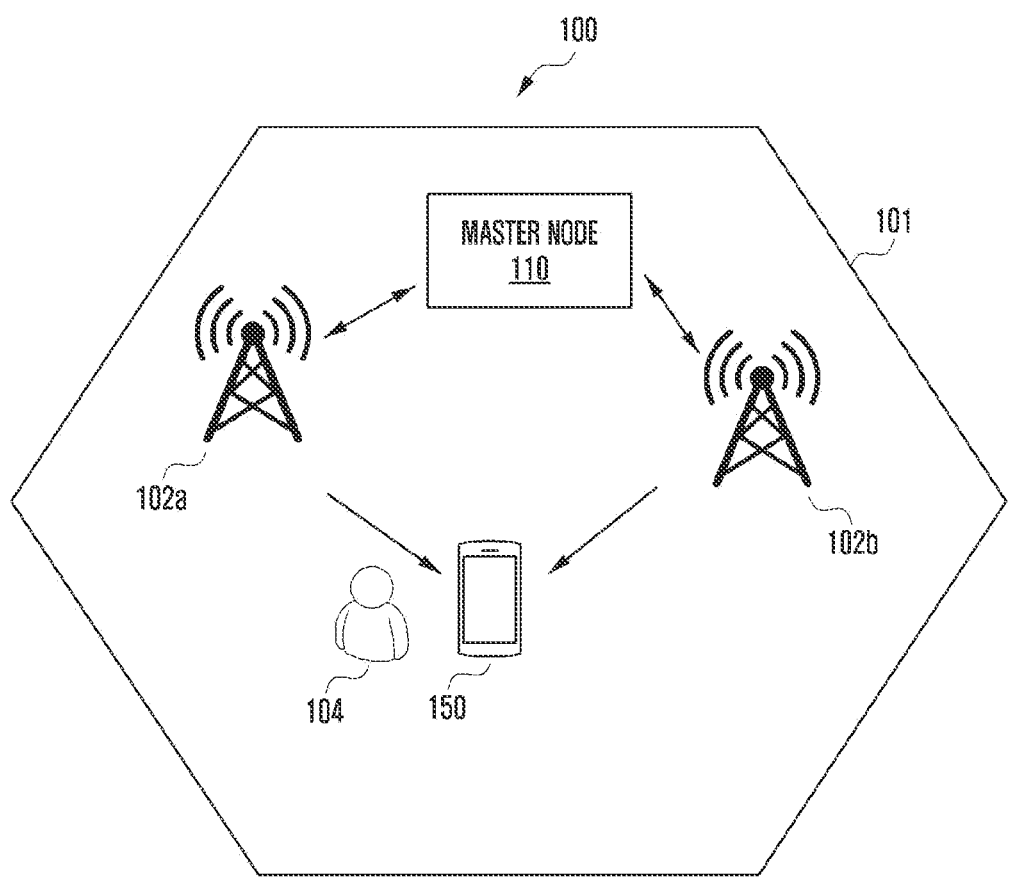
FIG. 1 illustrates a schematic representation of a wireless communication system depicting a plurality of TRPs within a cell in 5G network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the document, the word "exemplary" is used herein to mean "serving as an example, instance, or illustration". Any embodiment or implementation of the subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

It shall be noted that, for convenience of explanation, the disclosure uses terms and names defined in the 3rd Generation Partnership Project Radio Access Network (3GPP RAN) standards. More specifically, the terms 'PDCCH', 'PDSCH', 'PUSCH', 'PUCCH', 'downlink control information (DCI)', 'UL', DL, 'TCI state', 'unified TCI state', 'indicated TCI state', 'CORESET', 'CORESETPOOLINDEX', and 'Transmission Reception Point', are to be interpreted as specified by the 3GPP RAN standards. The term 'Transmission Reception Point' is referred to simply as TRP and a set of TRPs providing service to the User Equipment (referred to herein as UE') is referred to interchangeably as muti-TRP or m-TRPs throughout the disclosure.

FIG. 1 is an example representation of a wireless communication system 100, according to an embodiment of the disclosure.

Referring to FIG. 1, the wireless communication system 100 is an example of the fifth Generation (5G) communication system. The disclosure specifically relates to a m-TRP scenario in the wireless communication system 100 where more than one TRP intend to provide service (i.e., schedule PDSCH data) for a User Equipment. As such, the wireless communication system 100 depicts a plurality of TRPs, for example, TRPs 102a and 102b within a cell 101 in the wireless communication system 100. The plurality of TRPs (also referred to herein interchangeably as 'multi-TRPs' or 'm-TRPs') are vital in 5G communication systems to improve reliability, coverage, and capacity performance through flexible deployment scenarios. It shall be noted that only two TRPs (i.e., TRP 102a and 102b) have been shown in FIG. 1 for exemplary purposes and the cell 101 may include more than two TRPs in the m-TRP scenario. Further, it shall be noted that only a single cell 101 has been depicted in the wireless communication system 100 for ease of description and embodiments of the disclosure may be implemented in a plurality of such cells arranged in the wireless communication system 100 for enabling reception of PDCCH in m-TRP scenarios.

Accordingly, the plurality of TRPs 102a and 102b may be located within the cell 101, for example, a macrocell which spans over a small town. It shall be noted that the location of the plurality of TRPs 102a and 102b within a microcell is shown for exemplary purposes and the plurality of TRPs 102a and 102b may be located in femtocells, picocells or microcells. For example, the plurality of TRPs 102a and 102b may be located in a picocell which is a small segment of a macro site, for example, a dense urban area such as, stadiums, train stations, malls, and areas with high data capacity requirements and coverage.

In an example, the plurality of TRPs 102a and 102b may be located within the cell 101 and provide service to a plurality of User Equipment (UEs) located within a predefined distance (i.e., also referred to herein as coverage area). For example, the plurality of TRPs 102a and 102b provide services such as, viewing/accessing content to plurality of UEs in a picocell, for example, the UE 150 associated with a user 104. Examples of the UE 150 include, but not limited to, any device used by the user 104 to communicate and/or access content such as, but not limited to, mobile phones, laptops, wearables, Internet of Things (IoTs), and the like. The plurality of TRPs 102a and 102b may be controlled by a master node 110 which is a layer stack with processing capability. In an embodiment, the master node 110 is a next-generation node B (gNB) or a base station within the cell 101 and controls the TRPs 102a and 102b within the cell 101. More specifically, the master node 110 generates control messages and signaling for facilitating connection of the UE 150 with the plurality of TRPs 102a, 102b.

In an example scenario, the user 104 operating the UE 150 may be traveling and as such, the user 104 may have moved to a different geographical location. For example, the user 104 moved to the cell 101 from a neighboring cell (not shown in FIG. 1). As such, the UE 150 must be configured to receive PDCCH and PDSCH from the m-TRPs 102a and 102b of that cell 101. As specified by 3GPP standards, the UE 150 needs to apply TCI states for enabling receipt of the PDCCH.

Various embodiments of the disclosure disclose an improved method for enabling reception of a plurality of PDCCH from a plurality of TRPs. More specifically, the objective of the disclosure is reusing the CORESETpoolindex for Unified TCI framework for multiple TCI states in the m-TRP scenario. In other words, a RRC configuration messages from gNB includes signaling parameters such as, CORESETpoolindex to indicate m-TRP scenario and a TCI state indicating parameter for indicating to the UE 150 on usage of indicated TCI state of the Unified TCI framework to be applied for reception of PDCCH. Such an RRC configuration message bridges the m-TRP procedures with Rel 17 Unified TCI state by ensuring CORESET specific TCI states are applied to the UE 150 for reception of the plurality of PDCCH from the plurality of TRPs 102a and 102b. In general, when the plurality of CORESETs are UE dedicated CORESETs, then for any PDCCH reception and respective PDSCH reception, UE 150 always applies the indicated Rel-17 TCI state. When the plurality of CORESETs are: (1) combination CORESETs, or (2) one CORESET is combination CORESET and one CORESET is UE dedicated CORESET, then for any PDCCH reception on a plurality of CORESETs and respective PDSCH reception, whether or not the UE 150 to apply the indicated Rel-17 TCI state associated with the cell is determined per CORESET by the RRC configuration message and the TCI state indicating parameter. In m-TRP scenarios, to have multiple TCI states as required in Release 15/16 and to ensure less impact on specification, CORESETpoolindex from Release 16 is used in an innovative way to apply Release 17 Unified TCI rules for multi DCI scenario. Enabling of the UE 150 for reception of PDCCH from the plurality of TRPs 102a and 102b is explained in detail with reference to FIGS. 2, 3, 4A to 4C, 5, and 6.

Figure 2:
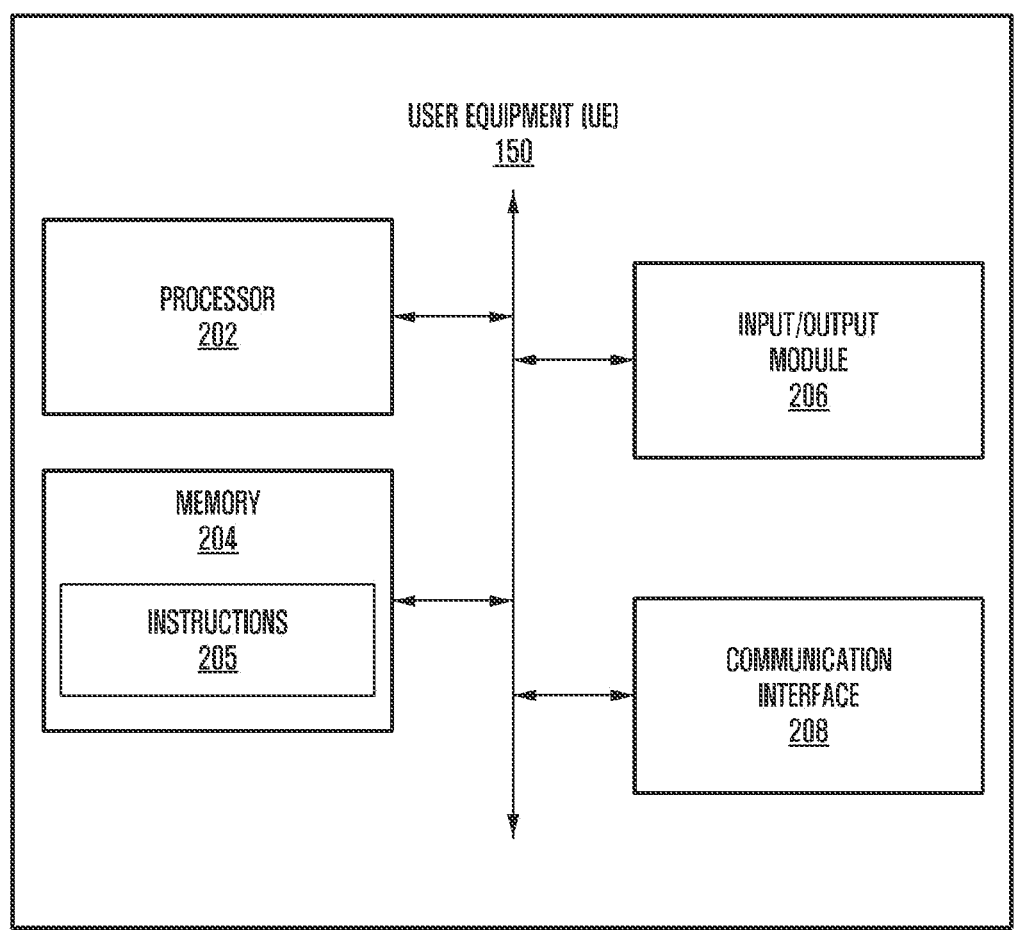
FIG. 2 illustrates a User Equipment for enabling reception of a plurality of PDCCH from a plurality of TRPs, according to an embodiment of the disclosure.

FIG. 2 illustrates the UE 150 for enabling reception of a plurality of PDCCH from a plurality of TRPs 102a and 102b, according to an embodiment of the disclosure. As already explained, the UE 150 is any device enabled with 5G in the wireless communication system 100 and capable of performing one or more of the operations described herein.

Referring to FIG. 2, the UE 150 is depicted to include a processor 202, a memory 204, an input/output module 206, and a communication interface 208. It shall be noted that, in some embodiments, the UE 150 may include more or fewer components than those depicted herein. The various components of the UE 150 may be implemented using hardware, software, firmware or any combinations thereof. Further, the various components of the UE 150 may be operably coupled with each other. More specifically, various components of the UE 150 may be capable of communicating with each other using communication channel media (such as buses, interconnects, etc.).

In one embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like.

In one embodiment, the memory 204 is capable of storing machine executable instructions, referred to herein as instructions 205. In an embodiment, the processor 202 is embodied as an executor of software instructions. As such, the processor 202 is capable of executing the instructions 205 stored in the memory 204 to perform one or more operations described herein.

The memory 204 can be any type of storage accessible to the processor 202 to perform respective functionalities, as will be explained in detail with reference to FIGS. 3, 4A to 4C, and 5. For example, the memory 204 may include one or more volatile or non-volatile memories, or a combination thereof. For example, the memory 204 may be embodied as semiconductor memories, such as flash memory, mask read only memory (ROM), programmable ROM (PROM), erasable PROM (EPROM), random access memory (RAM), etc. and the like. In an embodiment, the memory 204 may store an association table. The association table includes associations such as, but not limited to, associations between CORESETPOOLINDEX, CORESETs and TRP. In 3GPP standard, each TRP of the plurality of TRPs 102a and 102b, are distinguished by different CORESETs (i.e., each CORESET only corresponds to one TRP). For example, the TRP 102a may be associated with a CORESET P, the TRP 102b may be associated with a CORESET Q. As such, different TRPs can use different CORESET groups to transmit the plurality of PDCCHs. Accordingly, the CORESETs in different CORESET groups are distinguished by different CORESET group indexes (hereinafter interchangeably referred to as 'CORESETPoolIndex'). With this parameter, the UE 150 can assume that all the data scheduled by PDCCH in CORESETs with the same CORESETPoolIndex comes from same TRP or different TRPs. For example, if the CORESET P is associated with CORESETPoolIndex=1, then PDCCH received from CORESET P is associated with a single TRP (e.g., TRP 102a). Such associations are stored in the association table. An example of configuring CORESET is explained later with reference to FIG. 3.

In an embodiment, the processor 202 is configured to execute the instructions 205 for: (1) receiving at least one Radio Resource Control (RRC) configuration message, (2) receiving a TCI state indicating parameter in relation to the at least one RRC configuration message, (3) determining a CORESET type of a plurality of CORESETs, (4) applying distinct indicated TCI states based on the TCI state indicating parameter and the at least one RRC configuration message, (5) applying an indicated TCI state associated with each CORESET of the plurality of CORESETs to receive the PDCCH from each TRP of the plurality of TRPs 102a and 102b based on the CORESET type and a value of the TCI state indicating parameter in the at least one RRC configuration message. Further, the processor 202 is configured to execute the instructions 205 for enabling the reception of the plurality of PDCCH from the plurality of TRPs.

In an embodiment, the input/output (I/O) module 206 may include mechanisms configured to receive inputs from and provide outputs to peripheral devices such as, a gNB, the plurality of TRPs 102a and 102b, and/or the user 104 of the UE 150. To enable reception of inputs and provide outputs to the UE 150, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like.

In an embodiment, the communication interface 208 may include mechanisms configured to communicate with other entities in the wireless communication system 100 such as, other network nodes such as master node (i.e., gNB), or the set of TRPs (i.e., TRPs 102a and 102b) for accessing media content, transmitting media content or receiving media content. As such, the communication interface 208 is configured to receive at least one RRC configuration message. In an embodiment, the master node 110 (i.e., gNB) generates the at least one RRC configuration message for the UE 150. As already explained, the at least one RRC configuration message enables the UE 150 to connect with the plurality of TRPs 102a and 102b in the cell 101. In an embodiment, the master node 110 sends a plurality of RRC configuration messages ($R_1$, $R_2$) to the plurality of TRPs 102a, 102b which forwards the same to the UE 150. For example, the RRC configuration message $R_1$ is sent by the master node 110 to the TRP 102a for transmitting to the UE 150 and scheduling PDCCH from the TRP 102a. Similarly, the RRC configuration message $R_2$ is sent by the master node 110 to the TRP 102b for transmitting to the UE 150 and scheduling PDCCH from the TRP 102b. In another embodiment, a single RRC configuration message $R_{12}$ may be transmitted by the master node 110 to the TRP 102a. In such cases, the TRP 102a transmits the RRC configuration message $R_{12}$ to the UE 150 for configuring the UE 150 to receive PDCCH from the TRPs 102a, and 102b.

In an embodiment, the at least RRC configuration message $R_{12}$ received from a TRP (e.g., TRP 102a) of the plurality of TRPs 102a, 102b includes at least: one or more CORESETpoolindex for one or more corresponding CORESETs associated with the at least one TRP 102a, 102b. In another embodiment, if separate RRC configuration messages $R_1$ and $R_2$ are transmitted to TRPs 102a and 102b, respectively, each RRC configuration message (i.e., $R_1$ and $R_2$) includes a CORESETpoolindex for a CORESET associated with the TRP. For example, $R_1$ includes a CORESETpoolindex for a CORESET associated with the TRP 102a and $R_2$ includes a CORESETpoolindex for a CORESET associated with the TRP 102b. The CORESETpoolindex for a CORESET is an index of a CORESET pool for the corresponding CORESET. For example, if CORESET P is associated with the TRP 102a, then a CORESETpoolindex=0 may be received as part of the RRC configuration message $R_1$.

In general, each RRC configuration message is used to configure the corresponding CORESET and a plurality of search spaces ($S_1$, $S_2$, . . . , $S_n$) associated with the CORESET. It shall be noted that although only a CORESETpoolindex data field for a CORESET associated with the TRP is indicated in relation to the RRC configuration message for explaining the disclosure, the RRC configuration message may include a plurality of data fields related to various parameters as defined by the 3GPP standard such as, a CORESET-related identification (ID), TCI information related to the CORESET, and a time/frequency resource setting of the CORESET.

The search space refers to an area in the DL resource grid where PDCCH may be carried. Typically, a CORESET has a plurality of search spaces, for example, 4 search spaces. As such, the UE 150 performs blind decoding throughout these search spaces trying to find the PDCCH. The search spaces are defined in the 3GPP standard and may be one of: UE specific search space (USS), common search space (CSS) type 0, CSS type 0A, CSS type 1, CSS type 2, CSS type 3. In an example, the CORESET may have 4 USS. In another example, the CORESET may have one USS and 3 CSSs of type 0, 1 and 2. An example of configuring a CORESET is explained next with reference to FIG. 3.

Figure 3:
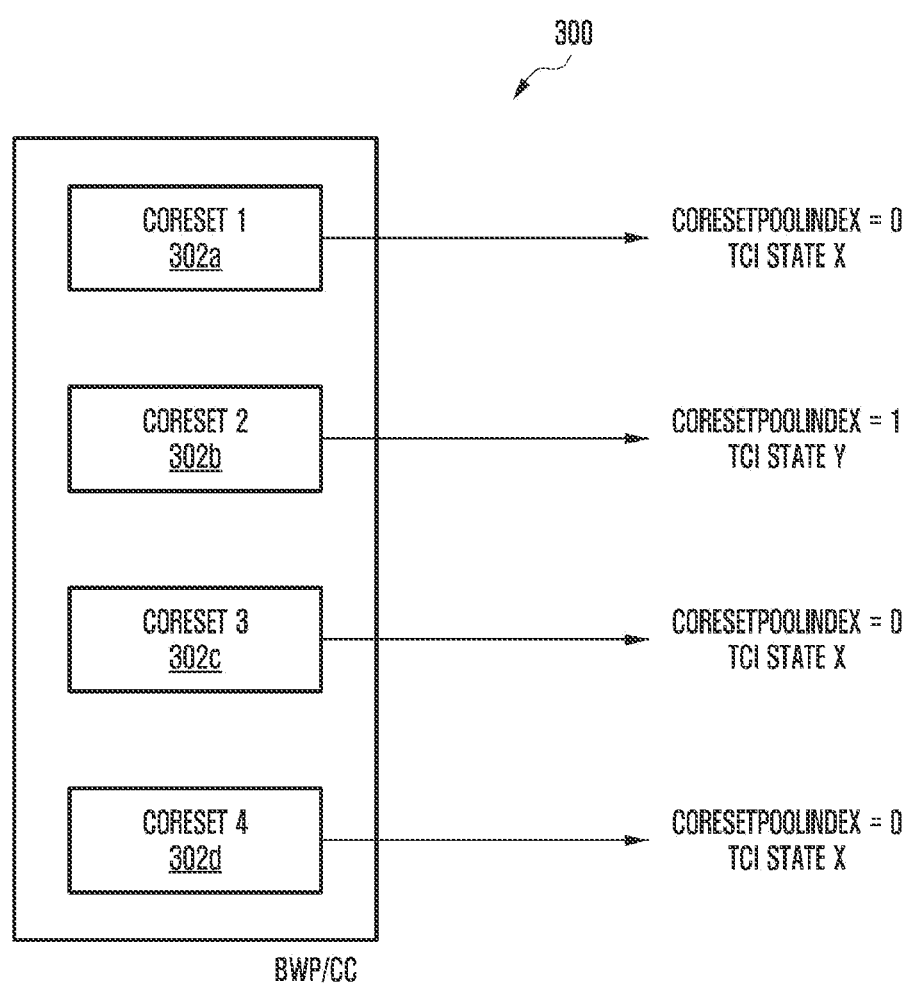
FIG. 3 is a depiction of configuring a plurality of CORESETs, according to an embodiment of the disclosure.

FIG. 3 is a representation 300 of configuring a plurality of CORESETs, according to an embodiment of the disclosure. As already explained, each CORESET is associated with a TRP of the plurality of TRPs 102a and 102b. As such, each CORESET is associated with a RRC parameter CORESET-PoolIndex as indicated in the RRC configuration message. In other words, an index of the CORESET pool may mean a CORESET group ID. In an example, an index of the CORESET pool (e.g., CORESETPoolIndex) may be set to 0 or 1.

Referring to FIG. 3, in this example representation 300, a Bandwidth Part (BWP) has a plurality of CORESETS 302a, 302b, 302c, 302d (i.e., CORESET 1, CORESET 2, CORESET 3, CORESET 4). Each of these CORESETs may be associated with a TRP of the plurality of TRPs 102a and 102b. For example, CORESET 1 may be associated with TRP 102a, and CORESET 2 may be associated with TRP 102b.

In this example representation, CORESETs 302a, 302c, 302d (i.e., CORESET 1, CORESET 3, CORESET 4) belong to a single pool and are represented by CORESETPoolIndex=0 whereas CORESET 302b (i.e., CORESET 2) belongs to a different pool and is represented by CORESETPoolIndex=1. Further, each of these CORESETs 302a, 302b, 302c, 302d may be associated with a CORESET-related ID, and TCI information related to the CORESET which are specified in the RRC configuration message. More specifically, CORESETs with same CORESETPoolindex are associated with distinct TCI states according to Release 17 unified TCI framework which is depicted in FIG. 3. In an embodiment, each CORESET of the plurality of CORESETs is configured with an indicated TCI state by Medium Access Control (MAC) Control Element (CE). For example, MAC CE configures CORESET 1 with a CORESET ID #5 and TCI state X, CORESET 2 with CORESET ID #3 and TCI state Y, CORESET 3 with a CORESET ID #2 and TCI state X, and CORESET 4 with a CORESET ID #6 and TCI state X. As such, MAC CE configures each of the CORESETs with different CORESETPoolIndex with distinct TCI states. It shall be noted that, TCI state X/Y refers to TCI state ID configured in PDSCH-config based on Release 17 Unified TCI for m-TRP scenario. Further, it shall be noted that the RRC configuration message from each TRP may also include information related to the CORESET ID, and TCI information related to the CORESET for each TRP of the plurality of TRPs 102a and 102b.

The communication interface 208 also receives a TCI state indicating parameter ($T_p$) in relation to the at least one RRC configuration message. The TCI state indicating parameter is assigned a value for indicating to the UE 150 on usage of Unified TCI state. In an embodiment, the TCI state indicating parameter ($T_p$) is a 1 bit indication to follow the indicated release 17 TCI state. In other words, distinct indicated TCI states are applied to the UE 150 based on the TCI state indicating parameter and the at least one RRC configuration message which is explained later. The communication interface 208 forwards the at least one RRC configuration message and the TCI state indicating parameter ($T_p$) to the processor 202. The processor 202 in conjunction with instructions 205 in the memory 204 is configured to perform one or more of the operations as described herein.

The processor 202 is configured to determine a CORESET type of the plurality of CORESETs scheduling PDCCH from the plurality of TRPs (102a and 102b). As already explained, each TRP is associated with one or more CORESET. More specifically, since each TRP schedules its own PDSCHs through its own PDCCH, the processor 202 needs to monitor PDCCHs from different TRPs separately. As such, different TRPs i.e., the plurality of TRPs 102a, and 102b are distinguished by different CORESETs. In an example, CORESET 302a may be associated with TRP 102a and CORESET 302b may be associated with the TRP 102b. In another example, CORESET 302a and 302c may be associated with TRP 102a and CORESET 302b and 302d may be associated with the TRP 102b. In an embodiment, the CORESET type of the CORESET is determined based on the plurality of search spaces associated with the CORESET as one of: a UE-dedicated CORESET, a non-UE-dedicated CORESET and a combination CORESET.

In an embodiment, the CORESET type of the CORESET is determined as the UE dedicated CORESET when the plurality of search spaces ($S_1, S_2, \ldots, S_n$) are used for UE-dedicated reception of PDCCH. In other words, when the plurality of search spaces, for example, $S_1, S_2, S_3, S_4$ are USS or CSS type 3 for UE-dedicated reception of PDCCH, then the CORESET is classified as the UE dedicated CORESET. In an embodiment, the CORESET type of the CORESET is determined as the non-UE dedicated CORESET when the plurality of search spaces in the CORESET are common search spaces used for non UE-dedicated reception of PDCCH. In an example, if the plurality of search spaces $S_1, S_2, S_3, S_4$ are CSS type 0, 0A, 1, 2, then the CORESET is classified as the non-UE dedicated CORESET. In an embodiment, the CORESET type of the CORESET is determined as a combination CORESET when at least one search space of the plurality of search spaces is used for UE-dedicated reception of PDCCH and at least one search space of the plurality of search spaces is used for non UE-dedicated reception of PDCCH. In an example, if search spaces $S_1, S_3, S_4$ are CSS type 0A, and 1, respectively, whereas search space S 2 is USS, then the CORESET is classified as the combination CORESET. Accordingly, the processor 202 is configured to determine the CORESET type of each CORESET of the plurality of CORESETs associated with the at least one RRC configuration message scheduling PDCCH received from the plurality of TRPs (102a and 102b). In an example, all CORESETs associated with TRPs 102a and 102b, are UE-dedicated CORESETs. In another example, all CORESETs associated with the plurality of TRPs 102a and 102b are non-UE dedicated CORESETs. In yet another example, CORESETs associated with 102a, and 102b are combination CORESETs.

FIG. 4A illustrates an example scenario of enabling reception of a plurality of PDCCH from a corresponding plurality of TRPs, according to an embodiment of the disclosure.

Referring to FIG. 4A, an example scenario 400 of enabling reception of a plurality of PDCCH from a corresponding plurality of TRPs 102a, and 102b is illustrated in accordance with an embodiment of the disclosure. More specifically, the scenario 400 is an exemplary configuration of CORESETpoolindex for one or multiple CORESET (CORESET group) configured with single/multiple indicated TCI states according to Release 17 unified TCI framework. In this exemplary scenario 400, CORESET 402 (hereinafter referred to as CORESET X) associated with TRP 102a and CORESET 406 (hereinafter referred to as CORESET Y) associated with TRP 102b are both determined as UE-dedicated CORESETs. In other words, the plurality of search spaces in CORESET X and CORESET Y are USS or CSS type 3 for UE-dedicated reception of PDCCH. More specifically, the CORESETS configured in PDCCH-Config for UE 150 to receive UE dedicated PDCCH or from CORESETS only having search space of common search space (CSS) type 3 or User specific search space (USS) type, for M-DCI scenario to have different CORESETpoolindex. Accordingly, all the CORESETS having only search space of type CSS type 3/USS configured for one CC/BWP have either CORESETpoolindex 0 or 1. For example, CORESET X has a CORESETPoolIndex=0 and CORESET Y has a CORESETPoolIndex=1.

In an embodiment, the processor 202 is configured to apply an indicated TCI state associated with each CORESET of the plurality of CORESETs (i.e., CORESET X and CORESET Y) to receive the PDCCH from each TRP of the plurality of TRPs 102a and 102b, when the CORESET type of the plurality of CORESETs is the UE-dedicated CORESET. In an example, the CORESET 402 (i.e., CORESET X) used for UE dedicated PDCCH or CORESET having only search space of CSS type 3 or USS (see, search space 404a, 404b), having CORESETpoolindex set to 0 to have TCI state X and CORESET 406 (i.e., CORESET Y) used for other UE dedicated PDCCH or having search space of CSS type 3 or USS (see, search spaces 408a, 408b), having CORESETpoolindex set to 1, has TCI state Y.

Referring to FIG. 2, the processor 202 in conjunction with the instructions 205 stored in the memory 204 receives the TCI state indicating parameter ($T_p$) in relation to the at least one RRC configuration message. In an embodiment, the TCI state indicating parameter ($T_p$) is assigned a value for indicating to the UE (150) on usage of Unified TCI state. In an embodiment, the TCI state indicating parameter indicates to the processor 202 on whether or not the indicated Rel-17 TCI state associated with the CORESET has to be applied to the UE 150 for enabling reception of PDCCH. In other words, the TCI state indicating parameter ($T_p$) is a 1 bit indication to follow the indicated release 17 TCI state associated with each CORESET. As such, distinct indicated TCI states associated with CORESET based on the TCI state indicating parameter and the at least one RRC configuration message is applied to the UE 150 for enabling reception of PDCCH. In general, if the TCI state indicating parameter ($T_p$) is set to '1', then unified TCI state of CORESET associated with TRP from which corresponding RRC configuration message was received is applied to the UE 150 for enabling reception of PDCCH. More specifically, when the CORESET type of the plurality of CORESETs associated with the plurality of TRPs 102a and 102b is determined as one of: (1) at least one UE-dedicated CORESET and at least one combination CORESET, and (2) combination CORESET, the TCI state indicating parameter ($T_p$) is set to 1. These two scenarios are further explained with reference to FIGS. 4B and 4C.

FIG. 4B illustrates an example scenario of enabling reception of a plurality of PDCCH from a corresponding plurality of TRPs, according to an embodiment of the disclosure.

Referring to FIG. 4B in conjunction with FIG. 2, an example scenario 450 of enabling reception of a plurality of PDCCH from a plurality of TRPs 102a and 102b, in accordance with another embodiment of the disclosure. More specifically, the scenario 450 depicts two CORESETS 452, 456 (i.e., CORESET X and CORESET Y) following indicated Release 17 TCI states, where both CORESETS 452, 456 have both UE dedicated and non-UE dedicated type of search space associated with each of CORESETs X and Y. In other words, the CORESET X and CORESET Y are combination CORESETs associated with distinct TCI states according to unified TCI framework of Release 17.

In an embodiment, the processor 202 is configured to apply an indicated TCI state associated with each CORESET of the plurality of CORESETs 452, 456 (i.e., CORESET X and CORESET Y) to receive the PDCCH from each TRP of the plurality of TRPs (102a and 102b) when the plurality of CORESETs 452, 456 comprises at least one UE-dedicated CORESET (i.e., CORESET X/CORESET 452) and at least one combination CORESET (CORESET Y/CORESET 456) with the value of the TCI state indicating parameter set to 1. Further, for M>1 and/or N>1 having TCI states based on Release 17 Unified TCI framework, each CORESET (i.e., CORESET X and CORESET Y) having: (1) one search space of CSS type 0/0A/1/2 and (2) one CSS type 3 or USS type, with the TCI state indicating parameter ($T_p$) set to one for this CORESET types to receive UE dedicated PDCCH have different CORESETpoolindex. For example, the CORESET X has CORESETPoolIndex=0 and CORESET Y has CORESETPoolIndex=1. In general, all the CORESETS 452, 456 having one search space of CSS type 0/0A/1/2 indicated by 454b and 458b respectively and one search space of CSS type 3 or USS type indicated by 454a and 458a respectively, with TCI state indicating parameter ($T_p$) set to one for this CORESET type, configured for one CC/BWP to have either CORESETpoolindex 0 or 1. Accordingly, the TCI states associated with CORESETS (i.e., CORESET X and CORESET Y) which are of combination CORESET type having different/distinct CORESETpoolindex. For example, CORESET X is associated with TCI state X and CORESET Y is associated with TCI state Y.

In this example scenario 450, CORESETs X and Y are used for MDCI where, both CORESET (i.e., CORESET X and CORESET Y) are combination CORESETs i.e., at least one search space of CORESET X/Y having a CSS type and at least one search space of CORESET X/Y having a CSS type 3 or USS. When the TCI state indicating parameter ($T_p$) is set to one for this type of CORESETs, CORESET X having CORESETpoolindex set to 0 is associated with TCI state X and CORESET Y used for UE dedicated PDCCH having CORESETpoolindex set to 1 will have TCI state Y.

Figure 4C:
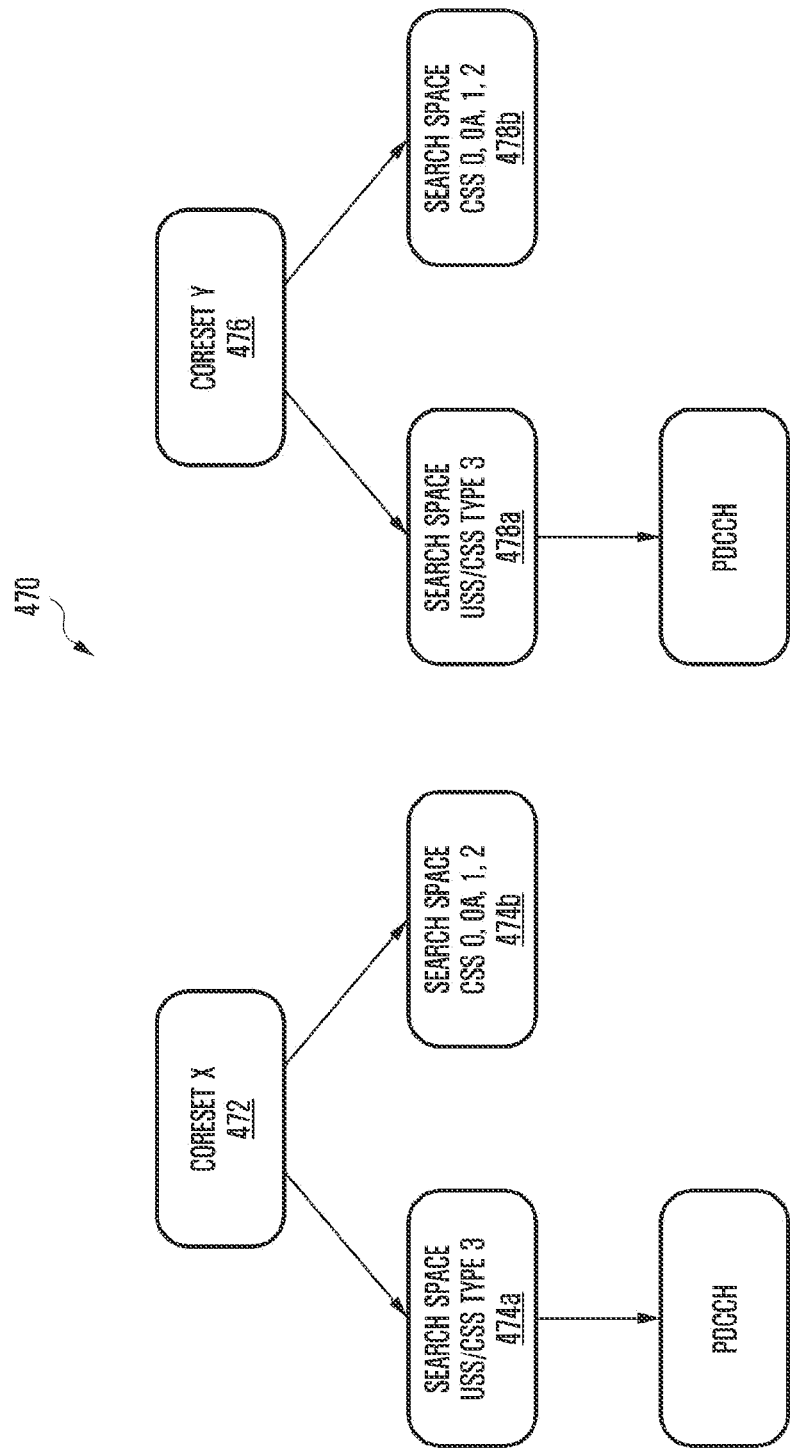
FIG. 4C illustrates an example scenario of enabling reception of a plurality of PDCCH from a corresponding plurality of TRPs, according to an embodiment of the disclosure.

FIG. 4C illustrates an example scenario of enabling reception of a plurality of PDCCH from a corresponding plurality of TRPs, according to an embodiment of the disclosure.

Referring to FIG. 4C in conjunction with FIG. 2, an example scenario 470 of enabling reception of a plurality of PDCCH from a plurality of TRPs 102a and 102b, is illustrated in accordance with yet another embodiment of the disclosure. In this example scenario, the two CORESETs 472, 476 (i.e., CORESET X and CORESET Y) are UE dedicated CORESET and combination CORESET. In other words, CORESET X has only UE dedicated search space and CORESET Y has both UE dedicated and non-UE dedicated search space. More specifically, CORESET X has only one CSS type 3 or USS indicated by 474a and at least one CSS type 0/0A/1/2 indicated by 474b. CORESET Y has at least one CSS type 0/0A/1/2 and one CSS type 3 or USS indicated by 478b and 478a respectively.

In this example scenario 470, if the TCI state indicating parameter is set to one, the CORESETs X and Y have different CORESETpoolindex and distinct TCI states based on Release17, Unified TCI framework. In general, the CORESET X of UE dedicated CORESET type having only CSS type 3 or USS and other CORESET (i.e., CORESET Y) having one search space of CSS type 0/0A/1/2 and one CSS type 3 or USS with TCI state indicating parameter set to one, to have different indicated TCI state.

In an embodiment, the processor 202 is configured to apply an indicated TCI state associated with each CORESET of the plurality of CORESETs (i.e., CORESET X and CORESET Y) to receive the PDCCH from each TRP of the plurality of TRPs (102a and 102b) when the CORESET type of the plurality of CORESETs is determined as the combination CORESET with the value of the TCI state indicating parameter set to 1. In an example, the CORESET X associated with CORESETpoolindex=0 to have TCI state X and other CORESET Y associated with CORESETpoolindex=1 to have TCI state Y when TCI state indicating parameter ($T_p$) is set to one.

Figure 5:
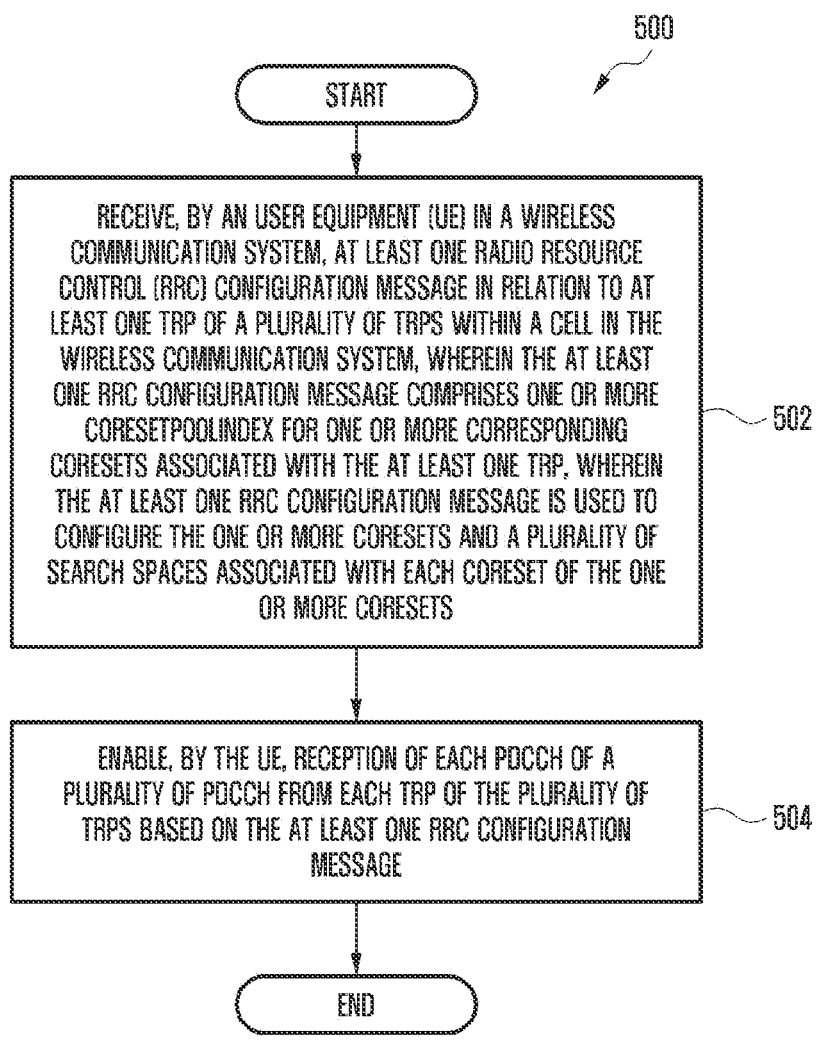
FIG. 5 is a flowchart illustrating a method for enabling reception of a plurality of PDCCH from a plurality of TRPs, according to an embodiment of the disclosure.

FIG. 5 is a flowchart illustrating a method for enabling reception of a plurality of PDCCH from a plurality of TRPs, according to an embodiment of the disclosure.

The method 500 depicted in the flow diagram may be executed by, for example, the UE 150. Some examples of the UE 150 include, but not limited to, 5G smartphones or 5G cellular devices connect over the 5G New Radio Access Network to the 5G core and further to Data Networks (DN), like the Internet. Operations of the flow diagram, and combinations of operation in the flow diagram, may be implemented by, for example, hardware, firmware, a processor, circuitry and/or a different device associated with the execution of software that includes one or more computer program instructions. The operations of the method 500 are described herein with help of the processor 202 embodied within the UE 150. It is noted that the operations of the method 500 can be described and/or practiced by using one or more processors of a system/device other than the UE 150, for example, a system remotely placed from the UE 150 and communicably coupled with the UE 150. The method 500 starts at operation 502.

Referring to FIG. 5, at operation 502 of the method 500, at least one Radio Resource Control (RRC) configuration message is received in relation to at least one TRP of a plurality of TRPs (102a and 102b) within a cell (101) in the wireless communication system (100), by a User Equipment (UE) in the wireless communication system 100 such as the, UE 150 shown and explained with reference to FIGS. 2, 3, and 4A to 4C. In an embodiment, the at least one RRC configuration message comprises one or more CORESET-poolindex for one or more corresponding CORESETs associated with the at least one TRP. For example, RRC configuration message $R_{12}$ includes CORESETPoolIndex associated with TRP 102a and 102b. As such, the RRC configuration message $R_{12}$ may be transmitted by the master node 110 to either TRP 102a or 102b for transmitting to the UE 150 to schedule PDCCH from both TRP 102a and 102b. In another embodiment, two RRC configuration messaged $R_1$ and $R_2$ may be transmitted from the master node 110 to TRPs 102a and 102b, respectively for configuring the UE 150 to receive PDCCH from TRP 102a and 102b. As such, RRC configuration message $R_1$ includes CORESETPoolIndex associated with TRP 102a and RRC configuration message $R_2$ includes CORESETPoolIndex associated with TRP 102b. The at least one RRC configuration message is used to configure the one or more CORESETs and a plurality of search spaces associated with each CORESET of the one or more CORESETs as explained with reference to FIG. 3.

Each RRC configuration message is used to configure the corresponding CORESET and a plurality of search spaces associated with the CORESET as explained with reference to FIG. 3.

At operation 504 of the method 500, the UE 150 is enabled for reception of each PDCCH of a plurality of PDCCH from each TRP of the plurality of TRPs (102a and 102b) based on the at least one RRC configuration message. Enabling reception of the plurality of PDCCH from the plurality of TRPs 102a and 102b, have been explained with reference to different scenarios shown and explained with reference to FIGS. 4A to 4C and have not been explained herein for the sake of brevity.

The sequence of operations of the method 500 need not be necessarily executed in the same order as they are presented. Further, one or more operations may be grouped together and performed in form of a single step, or one operation may have several sub-steps that may be performed in parallel or in sequential manner.

Figure 6:
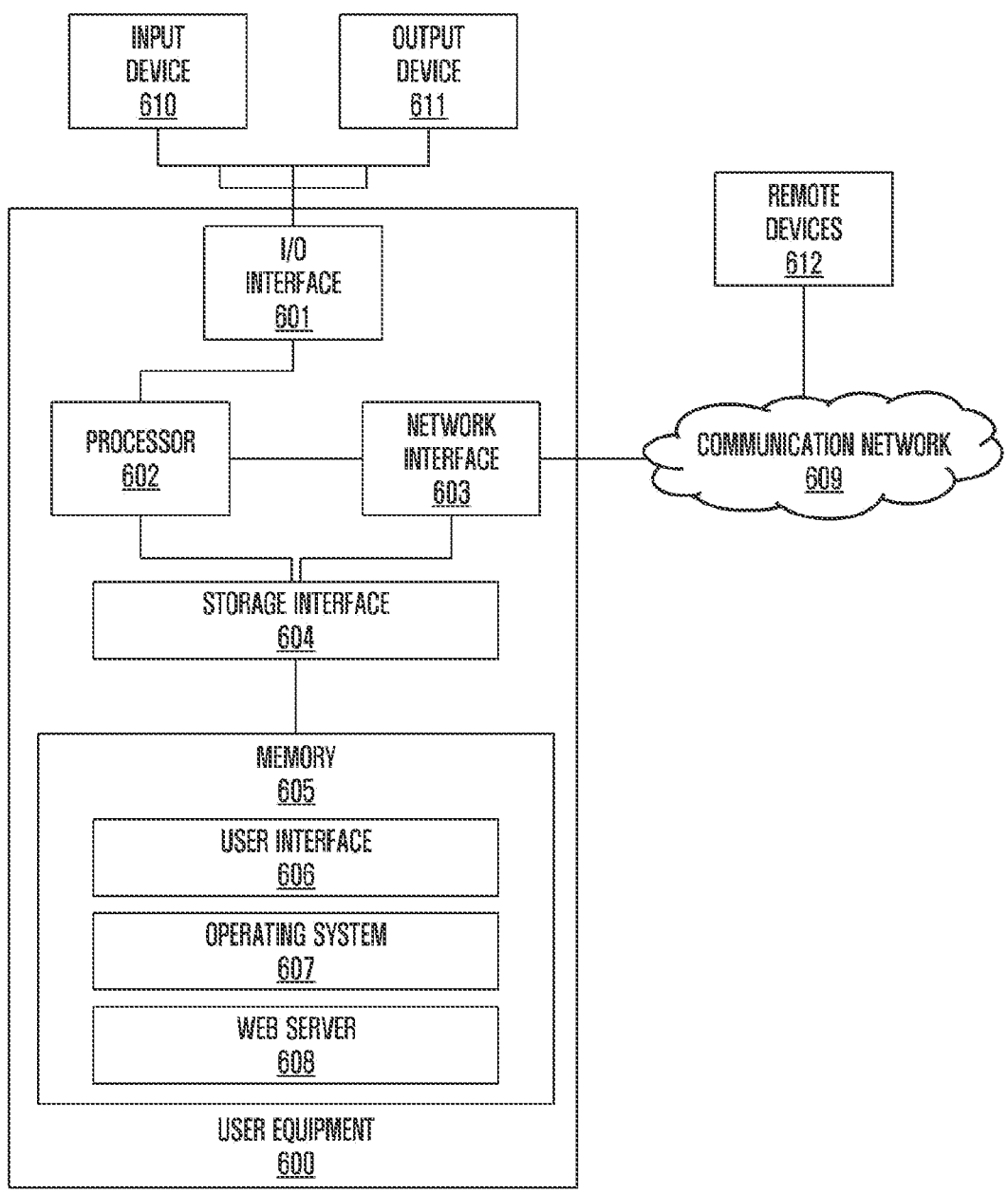
FIG. 6 shows a block diagram of a User Equipment (UE) for enabling reception of a plurality of PDCCH from a plurality of TRPs, according to an embodiment of the disclosure.

FIG. 6 shows a block diagram of a UE 150 in a wireless communication system 100 for enabling reception of a plurality of PDCCH from a plurality of TRPs 102a and 102b, according to an embodiment of the disclosure.

The UE 600 may comprise a central processing unit ("CPU" or "processor") 602. The processor 602 may comprise at least one data processor. The processor 602 may include specialized processing units such as integrated system (bus) controllers, memory management control units, floating point units, graphics processing units, digital signal processing units, etc. The UE 600 may be analogous to the UE 150 (shown in FIG. 2).

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, institute of electrical and electronics engineers (IEEE)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the UE 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, etc.

In some embodiments, the UE 600 is connected to the remote devices 612 through a communication network 609. The remote devices 612 may be a plurality of TRPs 102a and 102b, providing services to the UE 150, for example, 5G network services. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the UE 600 may communicate with the remote devices 612. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, 3GPP and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web server 608, etc. In some embodiments, UE 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the UE 600. Examples of operating systems include, without limitation, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™ BLACKBERRY® OS, or the like.

In some embodiments, the UE 600 may implement a web browser stored program component. The web browser may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers may utilize facilities such as AJAX™, DHTML™, ADOBER FLASH™, JAVASCRIPT™, JAVA™ Application Programming Interfaces (APIs), etc. In some embodiments, the UE 600 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™ JAVASCRIPT™, PERL™ PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the UE 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

The disclosed method with reference to FIG. 6, or one or more operations of the UE 150 explained with reference to FIGS. 2, 3, 4A to 4C, and 5 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer.

Figure 7:
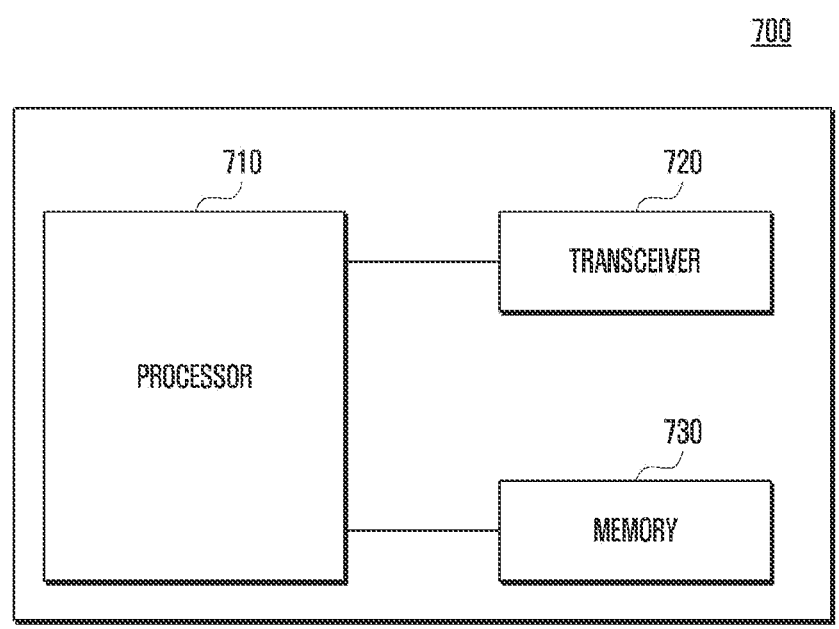
FIG. 7 illustrates an electronic device according to an embodiment of the disclosure.

FIG. 7 illustrates an electronic device according to an embodiment of the disclosure.

Referring to the FIG. 7, the electronic device 700 may include a processor 710, a transceiver 720 and a memory 730. However, all of the illustrated components are not essential. The electronic device 700 may be implemented by more or less components than those illustrated in FIG. 7. In addition, the processor 710 and the transceiver 720 and the memory 730 may be implemented as a single chip according to another embodiment.

The electronic device 700 may correspond to the UE described above.

The aforementioned components will now be described in detail.

The processor 710 may include one or more processors or other processing devices that control the proposed function, process, and/or method. Operation of the electronic device 700 may be implemented by the processor 710.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the electronic device 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or compact disc ROM (CD-ROM) and/or digital versatile disc (DVD) and/or other storage devices.

Figure 8:
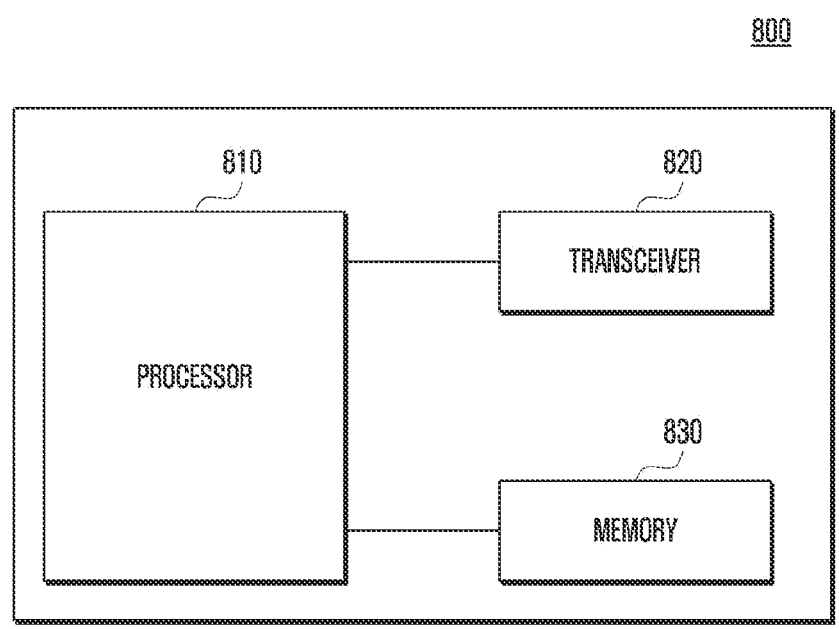
FIG. 8 illustrates a base station according to an embodiment of the disclosure.

FIG. 8 illustrates a base station according to an embodiment of the disclosure.

Referring to the FIG. 8, the base station 800 may include a processor 810, a transceiver 820 and a memory 830. However, all of the illustrated components are not essential. The base station 800 may be implemented by more or less components than those illustrated in FIG. 8. In addition, the processor 810 and the transceiver 820 and the memory 830 may be implemented as a single chip according to another embodiment.

The base station 800 may correspond to the gNB described above.

The aforementioned components will now be described in detail.

The processor 810 may include one or more processors or other processing devices that control the proposed function, process, and/or method. Operation of the base station 800 may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the base station 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Various embodiments of the disclosure provide numerous advantages. Embodiments of the disclosure provide a method and system for enabling reception of a plurality of PDCCH from a plurality of TRPs using a Unified TCI framework. In general, Unified TCI framework is being extended to more than one TCI state in uplink (UL) and downlink (DL) and the use case of increasing the number of TCI states is in m-TRP scenario. The disclosure is reusing the CORESETpoolindex for the new release 17 Unified TCI framework for multiple TCI states. In other words, RRC configuration messages from each TRP include signaling parameters such as, CORESETpoolindex to indicate m-TRP scenario and a TCI state indicating parameter for indicating to the UE 150 on usage of indicated TCI state of the Unified TCI framework to be applied for reception of PDCCH. Such RRC configuration messages bridge the m-TRP procedures with Rel 17 Unified TCI state by ensuring CORESET specific TCI states are applied to the UE 150 for reception of the plurality of PDCCH from the plurality of TRPs More specifically, the TCI state indicating parameter ($T_p$) is a 1 bit indication to follow the indicated release 17 TCI state.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to disclosures containing only one such recitation, even when the introductory phrases "one or more" or "at least one" and indefinite articles such as "a" or "an" (e.g., "a" and/or "an" should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations or two or more recitations).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:
   receiving, via radio resource control (RRC) signaling, a first configuration associated with control resource sets (CORESETs) and a second configuration associated with transmission configuration indicator (TCI) states, wherein TCI states are unified TCI states for downlink and uplink; and
   performing physical downlink control channel (PDCCH) reception in at least one first CORESET and at least one second CORESET among the CORESETs based on a first indicated TCI state and a second indicated TCI state among the TCI states, in case that:
      the at least one first CORESET corresponds to a first CORESET pool index and the at least one second CORESET corresponds to a second CORESET pool index;
      a parameter indicating to follow an indicated unified TCI state is respectively configured for the at least one first CORESET and the at least one second CORESET; and
      the at least one first CORESET and the at least one second CORESET are associated with at least one of predefined types corresponding to search space sets.

2. The method of claim 1, wherein PDCCH reception in the at least one first CORESET is quasi-co-located (QCLed) with a first source reference signal provided by the first indicated TCI state and PDCCH reception in the at least one second CORESET is QCLed with a second source reference signal provided by the second indicated TCI state.

3. The method of claim 1, wherein the at least one first CORESET and the at least one second CORESET are associated only with at least one of UE specific search space (USS) sets or type3-PDCCH common search space (CSS) sets, or with CSS sets other than type3-PDCCH CSS sets.

4. The method of claim 1,
   wherein the at least one first CORESET and the at least one second CORESET are configured in an active downlink bandwidth part (BWP).

5. The method of claim 1,
   wherein the first indicated TCI state is identified based on a first medium access control (MAC) control element (CE) associated with the first CORESET pool index, and
   wherein the second indicated TCI state is identified based on a second MAC CE associated with the second CORESET pool index.

6. A user equipment (UE) in a communication system, the UE comprising:
   a transceiver; and
   a processor coupled with the transceiver and configured to:
      receive, via radio resource control (RRC) signaling, a first configuration associated with control resource sets (CORESETs) and a second configuration associated with transmission configuration indicator (TCI) states, wherein TCI states are unified TCI states for downlink and uplink, and
      perform physical downlink control channel (PDCCH) reception in at least one first CORESET and at least one second CORESET among the CORESETs based on a first indicated TCI state and a second indicated TCI state among the TCI states, in case that:

the at least one first CORESET corresponds to a first CORESET pool index and the at least one second CORESET corresponds to a second CORESET pool index;

a parameter indicating to follow an indicated unified TCI state is respectively configured for the at least one first CORESET and the at least one second CORESET; and the at least one first CORESET and the at least one second CORESET are associated with at least one of predefined types corresponding to search space sets.

7. The UE of claim 6, wherein PDCCH reception in the at least one first CORESET is quasi-co-located (QCLed) with a first source reference signal provided by the first indicated TCI state and PDCCH reception in the at least one second CORESET is QCLed with a second source reference signal provided by the second indicated TCI state.

8. The UE of claim 6, wherein the at least one first CORESET and the at least one second CORESET are associated only with at least one of UE specific search space (USS) sets or type3-PDCCH common search space (CSS) sets, or with CSS sets other than type3-PDCCH CSS sets.

9. The UE of claim 6,
wherein the at least one first CORESET and the at least one second CORESET are configured in an active downlink bandwidth part (BWP).

10. The UE of claim 6,
wherein the first indicated TCI state is identified based on a first medium access control (MAC) control element (CE) associated with the first CORESET pool index, and
wherein the second indicated TCI state is identified based on a second MAC CE associated with the second CORESET pool index.

11. A method performed by a base station in a communication system, the method comprising:

transmitting, via radio resource control (RRC) signaling, a first configuration associated with control resource sets (CORESETs) and a second configuration associated with a plurality of transmission configuration indicator (TCI) states, wherein TCI states are unified TCI states for downlink and uplink; and performing physical downlink control channel (PDCCH) transmission in at least one first CORESET and at least one second CORESET based on a first indicated TCI state and a second indicated TCI state among the TCI states in case that:

the at least one first CORESET corresponds to a first CORESET pool index and the at least one second CORESET corresponds to a second CORESET pool index;

a parameter indicating to follow an indicated unified TCI state is respectively configured for the at least one first CORESET and the at least one second CORESET; and the at least one first CORESET and the at least one second CORESET are associated with at least one of predefined types corresponding to search space sets.

12. The method of claim 11, wherein PDCCH transmission in the at least one first CORESET is quasi-co-located (QCLed) with a first source reference signal provided by the first indicated TCI state and PDCCH transmission in the at least one second CORESET is QCLed with a second source reference signal provided by the second indicated TCI state.

13. The method of claim 11, wherein the at least one first CORESET and the at least one second CORESET are associated only with at least one of user equipment (UE) specific search space (USS) sets or type3-PDCCH common search space (CSS) sets, or with CSS sets other than type3-PDCCH CSS sets.

14. The method of claim 11,
wherein the at least one first CORESET and the at least one second CORESET are configured in an active downlink bandwidth part (BWP).

15. The method of claim 11,
wherein the first indicated TCI state is indicated based on a first medium access control (MAC) control element (CE) associated with the first CORESET pool index, and
wherein the second indicated TCI state is indicated based on a second MAC CE associated with the second CORESET pool index.

16. A base station in a communication system, the base station comprising:

a transceiver; and a processor coupled with the transceiver and configured to:

transmit, via radio resource control (RRC) signaling, a first configuration associated with control resource sets (CORESETs) and a second configuration associated with transmission configuration indicator (TCI) states, wherein TCI states are unified TCI states for downlink and uplink; and perform physical downlink control channel (PDCCH) transmission in at least one first CORESET and at least one second CORESET based on a first indicated TCI state and a second indicated TCI state among the TCI states, in case that:

the at least one first CORESET corresponds to a first CORESET pool index and the at least one second CORESET corresponds to a second CORESET pool index;

a parameter indicating to follow an indicated unified TCI state is respectively configured for the at least one first CORESET and the at least one second CORESET; and the at least one first CORESET and the at least one second CORESET are associated with at least one of predefined types corresponding to search space sets.

17. The base station of claim 16, wherein PDCCH transmission in the at least one first CORESET is quasi-co-located (QCLed) with a first source reference signal provided by the first indicated TCI state and PDCCH transmission in the at least one second CORESET is QCLed with a second source reference signal provided by the second indicated TCI state.

18. The base station of claim 16, wherein the at least one first CORESET and the at least one second CORESET are associated only with at least one of user equipment (UE) specific search space (USS) sets or type3-PDCCH common search space (CSS) sets, or with CSS sets other than type3-PDCCH CSS sets.

19. The base station of claim 16,
wherein the at least one first CORESET and the at least one second CORESET are configured in an active downlink bandwidth part (BWP).

20. The base station of claim 16,
wherein the first indicated TCI state is indicated based on a first medium access control (MAC) control element (CE) associated with the first CORESET pool index, and wherein the second indicated TCI state is indicated based on a second MAC CE associated with the second CORESET pool index.

\* \* \* \* \*